United States Patent
Cohen et al.

(10) Patent No.: US 9,944,860 B2
(45) Date of Patent: Apr. 17, 2018

(54) METHODS FOR TREATING A METATHESIS FEEDSTOCK WITH METAL ALKOXIDES

(71) Applicant: Elevance Renewable Sciences, Inc., Woodridge, IL (US)

(72) Inventors: Steven A. Cohen, Naperville, IL (US); Donde R. Anderson, Woodridge, IL (US); Zhe Wang, Aurora, IL (US); Timothy M. Champagne, Orange, CA (US); Thay A. Ung, Monrovia, CA (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 609 days.

(21) Appl. No.: 14/204,753

(22) Filed: Mar. 11, 2014

(65) Prior Publication Data

US 2014/0275681 A1    Sep. 18, 2014

Related U.S. Application Data

(60) Provisional application No. 61/783,720, filed on Mar. 14, 2013.

(51) Int. Cl.
*C10G 29/16* (2006.01)
*C10G 3/00* (2006.01)
*C10G 25/00* (2006.01)

(52) U.S. Cl.
CPC ............ *C10G 3/45* (2013.01); *C10G 25/003* (2013.01); *C10G 29/16* (2013.01); *C10G 2300/1014* (2013.01); *C10G 2300/1018* (2013.01); *Y02P 30/20* (2015.11)

(58) Field of Classification Search
CPC ..... C07C 11/06; C07C 7/14833; C07C 7/173; C10G 29/16
USPC ................ 585/324, 806, 809, 833, 852, 855
See application file for complete search history.

(56) References Cited

U.S. PATENT DOCUMENTS

| 4,942,228 | A | * | 7/1990 | Gibson ................ C07H 13/06 |
| | | | | 536/119 |
| 5,750,815 | A | | 5/1998 | Grubbs et al. |
| 5,922,863 | A | | 7/1999 | Grubbs et al. |
| 6,306,988 | B1 | | 10/2001 | Grubbs et al. |

(Continued)

FOREIGN PATENT DOCUMENTS

| WO | WO 2009020667 A1 | 2/2009 |
| WO | WO 2011046872 A2 | 4/2011 |

OTHER PUBLICATIONS

Davies, A.G.; Hall, C.D. "Peroxides of Elements other than Carbon. Part X. Organoperoxyaluminum Compounds as Intermediates in Redox Reactions", J. Chem. Soc. (1963), pp. 1192-1197.*

(Continued)

*Primary Examiner* — Philip Louie
*Assistant Examiner* — Aaron Pierpont
(74) *Attorney, Agent, or Firm* — Kilpatrick Townsend & Stockton LLP

(57) ABSTRACT

Various methods are provided for treating and reacting a metathesis feedstock. In one embodiment, the method includes providing a feedstock comprising a natural oil, chemically treating the feedstock with a metal alkoxide under conditions sufficient to diminish catalyst poisons in the feedstock, and, following the treating, combining a metathesis catalyst with the feedstock under conditions sufficient to metathesize the feedstock.

11 Claims, 5 Drawing Sheets

(56) References Cited

U.S. PATENT DOCUMENTS

| | | | |
|---|---|---|---|
| 6,414,097 B1 | 7/2002 | Grubbs et al. | |
| 6,696,597 B2 | 2/2004 | Pederson et al. | |
| 6,794,534 B2 | 9/2004 | Grubbs et al. | |
| 7,102,047 B2 | 9/2006 | Grubbs et al. | |
| 8,642,824 B2* | 2/2014 | Lemke | C10G 3/47 554/161 |
| 9,216,941 B2* | 12/2015 | Lemke | C10G 3/47 |
| 2005/0154221 A1* | 7/2005 | Lysenko | C07C 67/333 554/174 |
| 2007/0004917 A1 | 1/2007 | Bertrand et al. | |
| 2011/0112302 A1* | 5/2011 | Holtcamp | C07F 15/0046 548/103 |
| 2011/0160472 A1* | 6/2011 | Lemke | C10G 3/47 554/154 |

OTHER PUBLICATIONS

International Search Report and Written Opinion of the International Searching Authority issued in PCT Patent Application No. PCT/US2014/023339, dated Jun. 11, 2014, 10 pages.

* cited by examiner

METHODS FOR TREATING A METATHESIS FEEDSTOCK WITH METAL ALKOXIDES

CROSS-REFERENCE TO RELATED APPLICATIONS

This application claims the benefit of U.S. Provisional Application No. 61/783,720, filed Mar. 14, 2013, the entire contents of which are hereby incorporated by reference.

GOVERNMENT RIGHTS

This invention was made with Government support under grant no. DE-EE0002872/001 awarded by the Department of Energy. The U.S. Government has certain rights in this invention.

BACKGROUND

Metathesis is a catalytic reaction generally known in the art that involves the interchange of alkylidene units among compounds containing one or more double bonds (e.g., olefinic compounds) via the formation and cleavage of the carbon-carbon double bonds. Metathesis may occur between two like molecules (often referred to as self-metathesis) and/or it may occur between two different molecules (often referred to as cross-metathesis). Self-metathesis may be represented schematically as shown in Equation I.

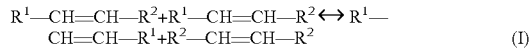
(I)

wherein $R^1$ and $R^2$ are organic groups.

Cross-metathesis may be represented schematically as shown in Equation II.

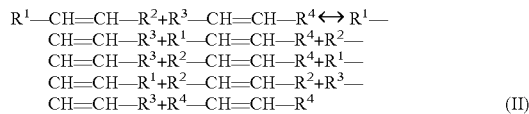
(II)

wherein $R^1$, $R^2$, $R^3$, and $R^4$ are organic groups.

In recent years, there has been an increased demand for environmentally friendly techniques for manufacturing materials typically derived from petroleum sources. For example, researchers have been studying the feasibility of manufacturing waxes, plastics, and the like, using natural feedstocks, such as vegetable and seed-based oils. In one example, metathesis catalysts are used to manufacture candle wax, as described in PCT/US 2006/000822, which is herein incorporated by reference. Metathesis reactions involving natural feedstocks offer promising solutions for today and for the future.

Natural feedstocks of interest typically include, for example, natural oils (e.g., vegetable oils, fish oil, animal fats) and derivatives of natural oils, such as fatty acids and fatty acid alkyl (e.g., methyl) esters. These feedstocks may be converted into industrially useful chemicals (e.g., waxes, plastics, cosmetics, biofuels, etc.) by any number of different metathesis reactions. Significant reaction classes include, for example, self-metathesis, cross-metathesis with olefins, and ring-opening metathesis reactions. Representative examples of useful metathesis catalysts are provided below. Metathesis catalysts can be expensive and, therefore, it is desirable to improve the efficiency of the metathesis catalyst.

Catalyst efficiency and product conversion can vary dramatically depending on the purity of the feedstock that is being metathesized. One of the challenges with using natural feedstocks is that naturally-derived feedstocks may include impurities, sometimes in trace amounts, that do not exist in petroleum feedstocks. These impurities often react with the metathesis catalyst and may drastically affect the efficiency of the catalyst and metathesis reaction. Moreover, the presence and level of various impurities in natural oils may vary from batch-to-batch, depending, for example, on the geographic location of the harvest, and even on the specific field of harvest as well as other growing conditions.

SUMMARY

Methods are disclosed for treating metathesis feedstocks with metal alkoxides.

In one embodiment, the method comprises providing a feedstock comprising a natural oil. The method further comprises chemically treating the feedstock with a metal alkoxide under conditions sufficient to diminish catalyst poisons in the feedstock. The method further comprises combining a metathesis catalyst with the feedstock under conditions sufficient to metathesize the feedstock. In certain embodiments, the method further comprises combining an adsorbent material with the feedstock. In some embodiments, the adsorbent material is added at an amount between 0.1 and 3.0 wt. %, or between 0.2 and 2.0 wt. %. In some embodiments, the adsorbent material is selected from the group consisting of silica gel, bleaching clay, activated carbon, charcoal, molecular sieves, zeolites, Fuller's earth, neutral alumina, basic alumina, Celite®, aluminum sulfate, calcium carbonate, kaolin, magnesium sulfate, potassium chloride, potassium magnesium sulfate, magnesium silicate, potassium sulfate, soda ash, sodium carbonate, and sodium sulfate.

In certain embodiments, the feedstock comprises one or more materials selected from the group consisting of algal oil, canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, and castor oil, natural oil derivatives thereof, and mixtures thereof.

In certain embodiments, the metal in the metal alkoxide is selected from the group consisting of aluminum, titanium, zirconium, copper, iron, cerium, and silicon. In other embodiments, the alkoxide in the metal alkoxide is selected from the group consisting of methoxide, ethoxide, n-propoxide, isopropoxide, butoxide, 2-methylpropoxide, and tert-butoxide. In some embodiments, the metal alkoxide is selected from the group consisting of titanium isopropoxide, aluminum ethoxide, aluminum isopropoxide, zirconium ethoxide, and mixtures thereof.

In certain embodiments, the metal alkoxide is added at a level of between 0.01 wt. % and 1 wt. % of the feedstock. In some embodiments, the chemically treating is conducted at a reactor temperature between 25° C. and 125° C., or between 30° C. and 100° C.

In certain embodiments, the metathesis reaction comprises a maximum theoretical conversion limit, and the metathesis catalyst catalyzes the metathesis of at least 50% of the maximum theoretical conversion limit at a catalyst loading of 15 ppm/db or less, 5 ppm/db or less, 3 ppm/db or less, 2 ppm/db or less, or 1 ppm/db or less. In some embodiments, the metathesis catalyst catalyzes the metathesis of at least 70% of the maximum theoretical conversion limit. In other embodiments, the metathesis catalyst catalyzes the metathesis of at least 85% of the maximum theoretical conversion limit. In yet other embodiments, the metathesis catalyst catalyzes the metathesis of at least 70% of the maximum theoretical conversion limit at a catalyst loading of 5 ppm/db or less. In yet other embodiments, the metathesis catalyst catalyzes the metathesis of at least 85% of the maximum theoretical conversion limit at a catalyst loading of 5 ppm/db or less.

In certain embodiments, the feedstock comprises a starting peroxide value of greater than 5 meq/kg or greater than 10 meq/kg and the chemically treating decreases the starting peroxide value of the feedstock to 1 meq/kg or less. In other embodiments, the chemically treating decreases the starting peroxide value of the feedstock to 0.5 meq/kg or less.

In another embodiment, the method comprises providing a feedstock comprising a natural oil having a starting peroxide value. The method further comprises chemically treating the feedstock with a metal alkoxide for a time sufficient to reduce the starting peroxide value of the feedstock by approximately 80% or more through a chemical reaction of the peroxide poisons. The method further comprises combining a metathesis catalyst with the feedstock under conditions sufficient to metathesize the feedstock. In some embodiments, the treating decreases the starting peroxide value of the feedstock by approximately 90% or more. In other embodiments, the time for the chemically treating reaction is between 1 hour and 24 hours.

DETAILED DESCRIPTION

Figure 1:
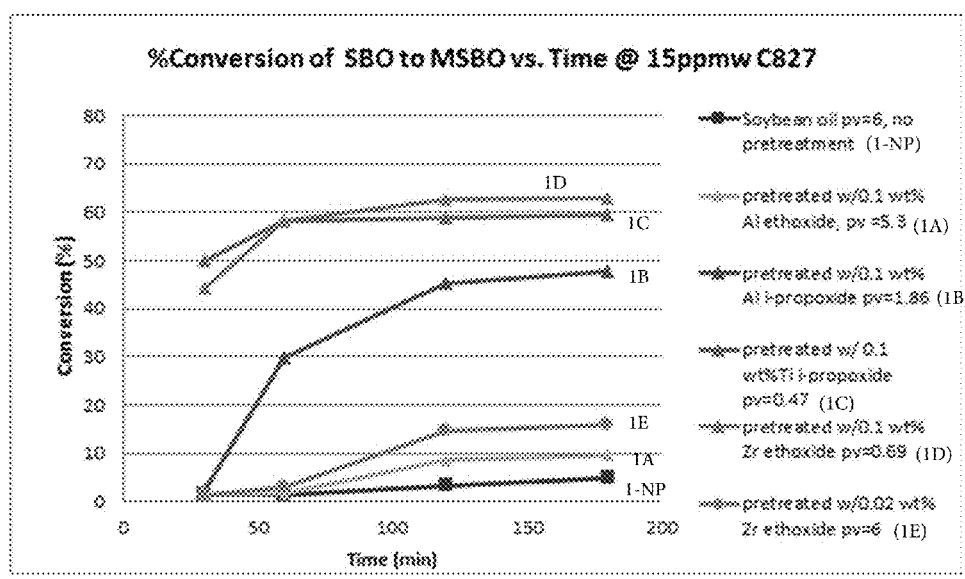
FIG. 1 is chart showing conversion % for soybean oil as a function of time and method of pretreatment.

The present application relates to treatment of metathesis feedstocks. Such treatments, which remove harmful catalyst poisons, are conducted prior to introducing a metathesis catalyst, thereby improving metathesis catalyst performance. Exemplary feedstocks may include natural oils.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the term "metathesis catalyst" includes any catalyst or catalyst system that catalyzes a metathesis reaction. Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. Non-limiting examples of metathesis catalysts are described in greater detail in U.S. Pat. Nos. 5,750,815; 5,922,863; 6,306,988; 6,414,097; 6,696,597; 6,794,534; 7,102,047; and U.S. Publication Nos. 2007/0004917 and 2011/0160472, all of which are herein incorporated by reference.

As used herein, the terms "natural oils," "natural feedstocks," or "natural oil feedstocks" may refer to oils derived from plants or animal sources. The term "natural oil" includes natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, and castor oil. Representative non-limiting examples of animal fats include lard, tallow, poultry fat, yellow grease, and fish oil. Tall oils are by-products of wood pulp manufacture.

As used herein, the term "natural oil derivatives" may refer to the compounds or mixture of compounds derived from the natural oil using any one or combination of methods known in the art. Such methods include but are not limited to saponification, fat splitting, transesterification, esterification, hydrogenation (partial or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

As used herein, the term "catalyst poison" includes any chemical species or impurity in a feedstock that reduces or is capable of reducing the functionality (e.g., efficiency, conversion, turnover number) of the metathesis catalyst. The term "turnover number" or "catalyst turnover" generally refers to the number of moles of feedstock that a mole of catalyst can convert before becoming deactivated.

As used herein, the term "peroxides" includes any and all peroxides, such as hydrogen peroxides, unless indicated otherwise.

As used herein, the term "non-peroxide poisons," or "other catalyst poisons," refers to catalyst poisons other than peroxides that may be found in natural oil feedstocks. These non-peroxide poisons include, but are not limited to, water, aldehydes, alcohols, byproducts from oxidative degradation, terminal conjugated polyenes, free fatty acids, free glycerin, aliphatic alcohols, nitriles, esters or aldehydes with unsaturated groups near the ester or aldehyde groups, d-sphingosine, phospholipids, and additional impurities, including "color bodies." Examples of "color bodies" include trace impurities such as indanes, naphthalenes, phenanthrenes, pyrene, alkylbenzenes, chlorophylls, and the like.

As used herein, the term "adsorbent" refers to any material or substance that is used, or that may be used, to absorb or adsorb another material or substance and includes solid, liquid, and gaseous absorbents and adsorbents.

As used herein, the term "catalyst efficiency" is defined as the percent conversion of feedstock and is measured by the GC-analysis of transesterified products, as described below.

As used herein, the term "maximum theoretical limit" or "maximum theoretical conversion limit" refers to the apparent maximum feedstock conversion determined through GC-analysis. For each metathesis reaction, there is a minimum catalyst loading amount required to achieve the maximum theoretical limit. Any increase in catalyst loading beyond this minimum loading will not improve conversion. Additionally, no amount of treatment to remove catalyst poisons will improve conversion beyond the maximum theoretical conversion limit. It is noted that different natural oil feedstocks may have different maximum theoretical conversion limits. Additionally, a particular feedstock may have a different maximum theoretical conversion limits based upon the type of metathesis reaction that the feedstock undergoes (cross- v. self-metathesis) or by the amount of co-reactant added in a cross-metathesis reaction. For example, based upon experimental data, self-metathesis of a soybean oil derivative has a maximum theoretical conversion limit of approximately 70%.

As used herein, the terms "metathesize" and "metathesizing" refer to the reacting of a feedstock in the presence of a metathesis catalyst to form a metathesis product comprising a new olefinic compound. Metathesizing may refer to cross-metathesis (a.k.a. co-metathesis), self-metathesis, ring-opening metathesis, ring-opening metathesis polymerizations (ROMP), ring-closing metathesis (RCM), and acyclic diene metathesis (ADMET). For example, metathesizing may refer to reacting two of the triglyceride molecules present in a natural feedstock (self-metathesis) in the presence of a metathesis catalyst, wherein each triglyceride has an unsaturated carbon-carbon double bond, thereby forming two new olefinic molecules which may include a dimer of the triglyceride. Additionally, metathesizing may refer to reacting an olefin, such as ethylene, and a triglyceride in a natural feedstock having at least one unsaturated carbon-carbon double bond, thereby forming two new olefinic molecules (cross-metathesis).

The presence and level of various impurities for natural oils may vary from location-to-location, field-to-field, or batch-to-batch. It may be difficult to predict the presence or level of certain impurities in the natural oil feedstock without extensive testing on each batch. Accordingly, it is important to be able to design a robust treatment for the various natural oil feedstocks with varying levels of impurities in order to diminish the impurities and improve catalyst performance and product conversion. As seen in the examples below, natural feedstocks have varying levels of peroxide impurities. Typically, the natural oil feedstock may have a peroxide value greater than 1 milliequivalent per 1000 g of feedstock (meq/kg). Typical peroxide values may be greater than 10 meq/kg. Edible or "food grade" natural oils typically have relatively low peroxide values, closer to 1 meq/kg. Typically non-edible or "industrial grade" natural oils or fatty acid methyl esters of natural oils typically have higher peroxide values. Based upon these examples for the fatty acid methyl esters of soybean and canola oil, the starting peroxide value is typically greater than 5 milliequivalents per 1000 g of feedstock (meq/kg). Examples also show that fatty acid methyl esters of a natural oil may exceed 10 meq/kg.

Catalyst efficiency may be improved using chemical techniques to treat a natural feedstock. Metathesis catalyst poisons may be diminished by chemically treating the feedstock prior to introducing the metathesis catalyst to the feedstock. A chemical treatment may target metathesis catalysts poisons, including peroxides. In certain embodiments, peroxides are correlative with catalyst efficiency and turnover, which may indicate that peroxides are a catalyst poison. Additionally, chemical treatments may react with other, non-peroxide, catalyst poisons, rendering them inactive. In some embodiments, treatment of a natural oil feedstock with a low starting peroxide value (e.g., <1 meq/kg) is capable of improving catalyst efficiency and turnover, indicating that while peroxide value is an important measure of feedstock quality, it is not the only factor.

Various methods are disclosed that include exposing a metathesis feedstock material to a chemical treatment in order to diminish metathesis catalyst poisons.

In certain embodiments, the feedstock comprises a natural oil. In some embodiments, the natural oil is selected from the group consisting of vegetable oils, algal oils, fish oils, animal fats, tall oils, derivatives thereof, and mixtures thereof. In some embodiments, the vegetable oil is selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, castor oil, derivatives thereof, and mixtures thereof. In other embodiments, the animal fat is selected from the group consisting of lard, tallow, poultry fat, yellow grease, fish oil, derivatives thereof, and mixtures thereof.

In certain embodiments, the feedstock is chemically treated with a metal alkoxide under conditions sufficient to diminish catalyst poisons in the feedstock through a chemical reaction of the catalyst poisons. In certain embodiments, following the chemical treating, a metathesis catalyst is combined with the feedstock under conditions sufficient to metathesize the feedstock.

In certain embodiments, the metal alkoxide comprises an alkali metal, alkaline earth metal, transition metal, post-transition metal, or metalloid. For example, in certain embodiments, the metal is selected from the group consisting of aluminum, copper, lead, nickel, tin, titanium, zinc, gold, silver, platinum, cobalt, mercury, tungsten, arsenic, beryllium, bismuth, cerium, cadmium, niobium, indium, gallium, germanium, lithium, selenium, tantalum, tellurium, vanadium, zirconium, sodium, magnesium, potassium, calcium, chromium, molybdenum, manganese, technetium, iron, ruthenium, osmium, rhodium, and palladium. In some embodiments, the metal is selected from the group consisting of aluminum, titanium, zirconium, copper, iron, cerium, and silicon. In one particular embodiment, the metal is titanium. In another embodiment, the metal is aluminum. In yet another embodiment, the metal is zirconium.

In certain embodiments, the alkoxide is selected from the group consisting of methoxide, ethoxide, n-propoxide (nPr), isopropoxide (iPr), butoxide, 2-methylpropoxide, and tert-butoxide.

In certain embodiments, the metal alkoxide is selected from the group consisting of titanium isopropoxide, aluminum ethoxide, aluminum isopropoxide, zirconium ethoxide, $MgAl_2(AlOiPr)_8$, and mixtures thereof. In one particular embodiment, the metal alkoxide is titanium isopropoxide. In another embodiment, the metal alkoxide is aluminum ethoxide. In yet another embodiment, the metal oxide is aluminum isopropoxide. In still another embodiment, the metal oxide is zirconium ethoxide. In one embodiment, the metal oxide is $MgAl_2(AlOiPr)_8$.

In certain embodiments, the chemical treatment includes combining the feedstock with a metal alkoxide, wherein the amount of metal alkoxide added is 5 wt. % or less of the feedstock (i.e., 5 parts by weight metal alkoxide per 100 parts by weight feedstock), 3 wt. % or less of the feedstock, 2 wt. % or less of the feedstock, or 1 wt. % or less of the feedstock. In some embodiments, between 0.001-5 wt. % metal alkoxide is added to the feedstock. In other embodiments, between 0.01-1 wt. % metal alkoxide is added to the feedstock.

In certain embodiments, the chemical treatment reaction between the feedstock and metal alkoxide is conducted at a reactor temperature between 0° C. and 150° C., between 25° C. and 125° C., or between 30° C. and 100° C. In one particular embodiment, the chemical treatment is conducted at approximately 100° C.

In certain embodiments, the chemical treatment reaction between the feedstock and the metal alkoxide is conducted for a time between 1 hour and 5 days, between 1-24 hours, or between 2-3 hours.

In some embodiments, a high-intensity mixer may be used in order to accelerate the rate of reaction. Examples of such devices include high shear mixers and centrifugal reactors.

In certain embodiments, the chemical treatment of the feedstock with a metal alkoxide diminishes the peroxide level in the feedstock to less than 1 meq/kg, less than 0.5 meq/kg, less than 0.4 meq/kg, less than 0.3 meq/kg, less than 0.2 meq/kg, or less than 0.1 meq/kg. In some circumstances, for example when the starting peroxide value of the feedstock is greater than 5 meq/kg, it may be possible to diminish the level of peroxides by at least 80%, or by at least 90%. In some circumstances, for example where the feedstock has a starting peroxide value that is greater than 10 meq/kg, it may be possible to diminish the level of peroxides by at least 80%, by at least 90%, or by at least 95%.

The methods may be used to diminish the amount of metathesis catalyst poisons in metathesis feedstocks. This allows metathesis feedstocks prepared in accordance with the methods to be metathesized at a high turnover number of the metathesis catalyst. In other words, diminishing catalyst poisons may assist in improvement to the catalyst efficiency and conversion.

By chemically treating the feedstock with a metal alkoxide, the reduction in catalyst poisons may improve feedstock conversion, and allow the opportunity to decrease catalyst loading. This is particularly desirable due to the high costs associated with typical metathesis catalysts. In certain embodiments, a metathesis reaction may catalyze the metathesis of at least 50% of the maximum theoretical conversion limit with a catalyst loading of 30 ppm or less per mol of carbon-carbon double bonds in the feedstock ("ppm/db"). For example, if the maximum theoretical conversion limit is 70% of the feedstock, it may be possible to catalyze or convert at least 35% of the feedstock (35/70=50%). In some embodiments, at least 50% conversion of the maximum theoretical limit is achieved with a catalyst loading of 15 ppm/db or less, 10 ppm/db or less, 5 ppm/db or less, 3 ppm/db or less, or 2 ppm/db or less.

In other embodiments, at least 70% conversion of the maximum theoretical limit is achieved with a catalyst loading of 30 ppm/db or less, 15 ppm/db or less, 10 ppm/db or less, 5 ppm/db or less, 3 ppm/db or less, or 2 ppm/db or less.

In yet other embodiments, at least 85% conversion of the maximum theoretical limit is achieved with a catalyst loading of 30 ppm/db or less, 15 ppm/db or less, 10 ppm/db or less, 5 ppm/db or less, 3 ppm/db or less, or 2 ppm/db or less.

In certain embodiments, with low catalyst loadings of 1 ppm/db, following the chemical treatment with the metal alkoxide, the metathesis reaction may catalyst the metathesis of at least 30% conversion of the maximum theoretical limit, at least 40% conversion of the maximum theoretical limit, at least 50% conversion of the maximum theoretical limit, or at least 60% conversion of the maximum theoretical limit.

In certain embodiments, following the chemical treatment reaction, excess metal alkoxide and/or byproducts from the reaction are not separated or removed from the feedstock prior to the subsequent metathesis reaction. In other embodiments, after the metal alkoxide chemical treatment, the feedstock may be washed with water to remove the excess metal alkoxide and/or byproducts from the reactions. One or more washing steps may be used. During each washing step, a water phase and an organic phase may form. The water phase may be separated from the organic phase by gravity settling, by centrifugation, or by other means of liquid-liquid separation, which are known to those skilled in the art. The organic phase (i.e. the chemically treated feedstock) may then be dried to remove residual traces of water. A vacuum flash dryer or other suitable means may be used to accomplish the removal of trace water.

In some embodiments, following water washing, the chemically treated feedstock is sparged with nitrogen in order to remove any oxygen that was added by the water washing. Additionally, the chemically treated feedstock may be stored under nitrogen until it is ready for use in a metathesis reaction, such as self-metathesis, cross-metathesis, or ring-opening metathesis reactions.

In certain embodiments, in addition to a chemical treatment, it may also be desirable to use physical means to diminish the level of poisons in the feedstock (herein described as a "chemical plus adsorbent treatment"). An adsorbent may be added to the feedstock to assist in diminishing the level of catalyst poisons. The adsorbent may be added before, during, or after any of the chemical treatment conditions previously described. In some embodiments, the adsorbent is added during or after the chemical treatment. In one embodiment, the adsorbent is added after the chemical treatment. In one particular embodiment, the adsorbent is added after the temperature of the chemical treatment has been cooled down below approximately 60° C. (if the chemical treatment was conducted at a temperature greater than 60° C.). In another embodiment, the adsorbent is added after the temperature of the chemical treatment has been cooled down below approximately 40° C. (if the chemical treatment was conducted at a temperature greater than 40° C.).

The adsorbent treatment may function in at least two capacities. The adsorbent may assist the chemical treatment process by further reducing catalyst poisons that would not have been successfully removed by chemical treatment alone. Additionally, the adsorbent may be used to remove any residual chemical additives. The adsorbent may also assist in removing various byproducts from the chemical reactions. In certain embodiments, the amount of adsorbent added to the feedstock ranges from about 0.1 wt. % to about 5 wt. % (i.e., 0.1-5 parts adsorbent per 100 parts feedstock) when used in conjunction with the chemical treatment. In some embodiments, the amount of adsorbent added to the feedstock ranges from about 0.1 wt. % to about 3 wt. %. In other embodiments, the amount of adsorbent added to the feedstock ranges from about 0.2 wt. % to about 2 wt. %.

Additional hold time and mixing is provided for the adsorbent. The necessary hold time will depend on the temperature and mixing intensity. High-intensity mixing may be employed. Typically, the adsorption treatment step is a matter of hours. In one embodiment, the adsorption treatment is less than an hour. In another embodiment, the time sufficient for the adsorption treatment is a matter of minutes.

Examples of adsorbents which may be used in combination with a metal alkoxide chemical treatment include, but are not limited to, molecular sieves, activated carbon, zeolites, silica gel, Fuller's earth, neutral alumina, basic Alumina, Celite, acid-activated clay, aluminum sulfate, calcium carbonate, Kaolin, magnesium sulfate, potassium chloride, potassium magnesium sulfate, potassium sulfate, soda ash, sodium carbonate, sodium sulfate, magnesium silicate, and the like.

In certain embodiments, the adsorbent is a silicate such as magnesium silicate (e.g., MAGNESOL from The Dallas Group of America, Inc.) may be used as the adsorbent for adsorbing catalyst poisons, chemical additives, and byproducts, especially any boron-containing compounds. In some embodiments, the level of magnesium silicate adsorbent ranges from about 0.1 wt. % to about 5 wt. % (i.e., 0.1-5 parts adsorbent per 100 parts feedstock) when used in conjunction with the chemical treatment. In other embodiments, the amount of magnesium silicate ranges from about 0.1 wt. % to about 3 wt. %. In yet other embodiments, the level of magnesium silicate ranges from about 0.2 wt. % to about 2 wt. %. Additional hold time and mixing may be provided for the magnesium silicate. Again, the necessary hold time will depend on the temperature and mixing intensity. High intensity mixing may be employed. Typically, the sufficient time for the adsorption treatment step with magnesium silicate is a matter of hours. In some embodiments, the adsorption treatment with magnesium silicate is less than an hour. In other embodiments, the time sufficient for the adsorption treatment with magnesium silicate is a matter of minutes. The magnesium silicate may be added before, during, or after any of the chemical treatment conditions previously described. In certain embodiments, the magnesium silicate is added during or after the chemical treatment. In one embodiment, the magnesium silicate is added after the chemical treatment.

The adsorbent may be removed by filtration, centrifugation, pouring or any other method of solid-liquid separation known to those skilled in the art. Optionally, a filter aid, such as Celite, can also be added at the time of adsorbent addition to aid subsequent filtration. The treated feedstock is typically cooled to less than about 40° C. before allowing exposure to air. In some examples of chemical treatment plus adsorbent treatment, the treated feedstock has a diminished peroxide value of less than 1 meq/kg. In other embodiments, the feedstock has a diminished peroxide value of less than 0.5 meq/kg, less than 0.4 meq/kg, less than 0.3 meq/kg, less than 0.2 meq/kg, or less than 0.1 meq/kg. In circumstances where the feedstock has a starting peroxide value that is greater than 5 meq/kg, it may be possible to diminish the level of peroxides with a chemical and adsorbent treatment by at least 80%, or by at least 90%. In circumstances where the feedstock has a starting peroxide value that is greater than 10 meq/kg, it may be possible to diminish the level of peroxides with a chemical and adsorbent treatment by approximately at least 80%, by at least 90%, or by at least 95%.

It should be noted that the chemical plus adsorbent treatment may be more effective in diminishing catalyst poisons than adsorbent treatment alone. Moreover, the combined treatment may also allow for a lower amount of adsorbent to be used in the treatment. When an adsorbent is used by itself, higher quantities of the adsorbent may be needed to achieve similar results in terms of diminished peroxide values. The use of higher quantities of adsorbent adds an undesired cost to the process. Additionally, adsorbent treatment alone may fail to diminish the other non-peroxide catalyst poisons.

After chemical or chemical plus adsorbent treatment, the treated feedstock may then be stored under nitrogen until ready for use in a metathesis reaction, such as self-metathesis, cross-metathesis, or ring-opening metathesis reactions.

After the chemical or chemical plus adsorbent treatment, the feedstock may be subjected to a metathesis reaction in the presence of a metathesis catalyst. Metathesis catalysts and techniques for using the metathesis catalysts are known in the art (see, for example, U.S. Pat. Nos. 5,750,815; 5,922,863; 6,306,988; 6,414,097; 6,696,597; 6,794,534; 7,102,047; and U.S. Publication Nos. 2007/0004917 and 2011/0160472), all incorporated by reference herein in their entireties.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

A number of feedstock samples were chemically treated with different metal alkoxides and then metathesized. Unless indicated otherwise, the self-metathesis reactions were conducted with 10 g of natural oil and a catalyst loading of 15 ppmw C827 [i.e., ruthenium[1,3-bis-(2,4,6-trimethylphenyl)-2-imidazolidinylidene]dichloro(3-methyl-2-butenylidene)(tricyclohexylphosphine)]. A stock solution of the C827 catalyst in toluene was prepared for these experiments. Unless indicated otherwise, chemical treatments with the metal alkoxides were conducted at 100° C. for 2 hours.

Example 1

A refined, bleached, deodorized (RBD) soybean oil sample was provided having a starting peroxide value of 6 meq/kg. Typical equilibrium metathesis conversion of RBD soybean oil is about 64-66%.

In one experiment, without any chemical treatment, the soybean oil was self-metathesized for 3 hours at 70° C. (1-NP). Additionally, in other experiments, several metal alkoxides were used to chemically pretreat the RBD soybean oil to observe whether or not the chemical treatment improved the subsequent self-metathesis reaction at 70° C. for 3 hrs. The metal alkoxide tests included: (a) 0.1 wt. % aluminum ethoxide (1A), (b) 0.1 wt. % aluminum isopropoxide (1B), (c) 0.1 wt. % titanium isopropoxide (1C), (d) 0.1 wt. % zirconium ethoxide (1D), (e) 0.02 wt. % zirconium ethoxide (1E), and (f) 0.1 wt. % silicon ethoxide (not shown on plot.) The conversion results are shown in FIG. 1.

Without chemical pretreatment, a conversion of 5% metathesized soybean oil was achieved. Treatment of the RBD soybean oil with 0.1 wt. % titanium isopropoxide resulted in a conversion of ≥60% after 3 hours. Treatment of the RBD soybean oil with 0.1 wt. % zirconium ethoxide also resulted in a conversion of ≥60% after 3 hours. Treatment with 0.1 wt. % aluminum isopropoxide resulted in a conversion of 48% after 3 hours. Treatment with 0.1 wt. % aluminum ethoxide resulted in a conversion of 10% after 3 hours. Treatment with 0.1 wt. % silicon ethoxide did not improve conversion over the non-chemically treated soybean oil (and is not shown on the chart). Treatment of the RBD soybean oil with 0.02 wt. % zirconium ethoxide resulted in a conversion of 15% after 3 hours.

Peroxide values were also measured after each pretreatment, prior to the self-metathesis reaction. The chart below shows the results.

| Chemical Treatment | Peroxide Value (meq/kg) |
| --- | --- |
| None | 6 |
| 0.1 wt. % aluminum ethoxide | 5.3 |
| 0.1 wt. % aluminum isopropoxide | 1.86 |
| 0.1 wt. % titanium isopropoxide | 0.47 |
| 0.1 wt. % zirconium ethoxide | 0.69 |
| 0.02 wt. % zirconium ethoxide | 6 |
| 0.1 wt. % silicon ethoxide | 5.02 |

Example 2

"Fresh" soybean oil sample was provided having a starting peroxide value of 1.24.

Figure 2:
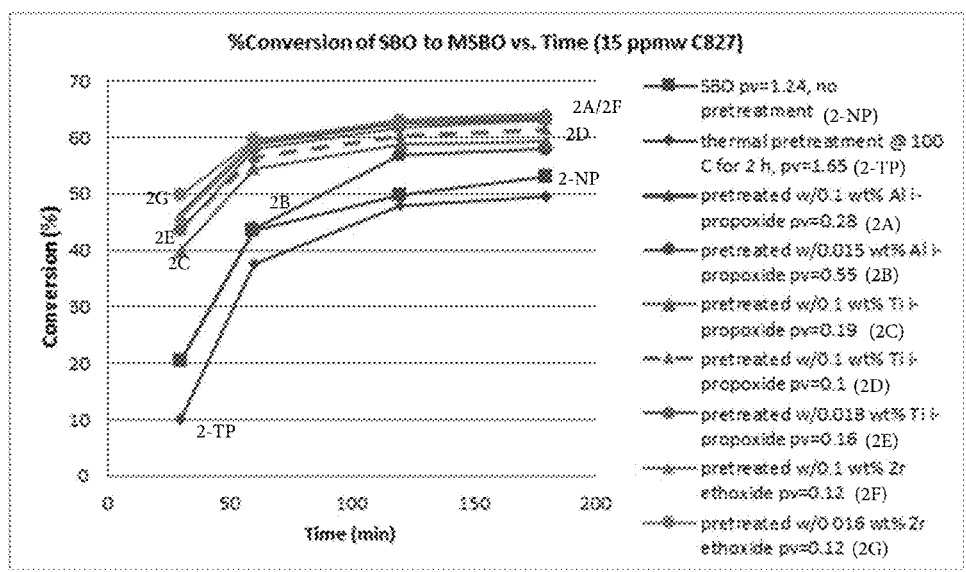
FIG. 2 is chart showing conversion % for "fresh" soybean oil as a function of time and method of pretreatment.

In one experiment, without any chemical treatment, the soybean oil was self-metathesized for 3 hours at 70° C. (2-NP). Also, in another experiment, a thermal pretreatment (without chemical treatment) of the soybean oil sample was conducted for 2 hours at 100° C. (2-TP). Additionally, in other experiments, several metal alkoxides were used to chemically pretreat the fresh soybean oil (for 2 hours at 100° C.) to observe whether or not the chemical treatment improved the subsequent self-metathesis reaction at 70° C. for 3 hrs. The metal alkoxide tests included: (a) 0.1 wt. % aluminum isopropoxide (2A), (b) 0.015 wt. % aluminum isopropoxide (2B), (c) 0.1 wt. % titanium isopropoxide (2C), (d) 0.1 wt. % titanium isopropoxide (2D), (e) 0.018 wt. % titanium isopropoxide (2E), (f) 0.1 wt. % zirconium ethoxide (2F), and (g) 0.016 wt. % zirconium ethoxide (2G). The conversion results are shown in FIG. 2.

Peroxide values were also measured after each pretreatment, prior to the self-metathesis reaction. The chart below shows the results.

| Chemical Treatment | Peroxide Value (meq/kg) |
| --- | --- |
| None | 1.24 |
| None (thermal treatment at 100° C.) | 1.65 |
| 0.1 wt. % aluminum isopropoxide | 0.28 |
| 0.015 wt. % aluminum isopropoxide | 0.55 |
| 0.1 wt. % titanium isopropoxide | 0.19 |
| 0.1 wt. % titanium isopropoxide | 0.1 |
| 0.018 wt. % titanium isopropoxide | 0.16 |
| 0.1 wt. % zirconium ethoxide | 0.12 |
| 0.016 wt. % zirconium ethoxide | 0.12 |

Example 3

Figure 3:
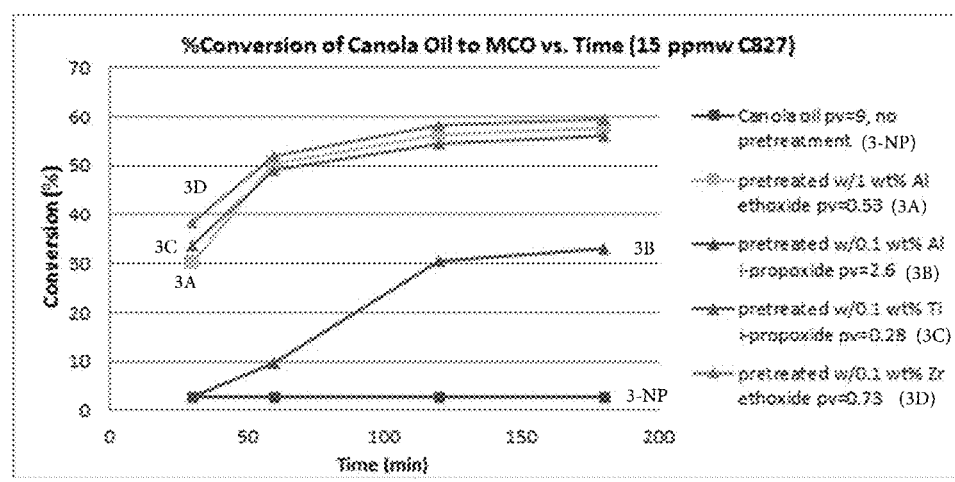
FIG. 3 is chart showing conversion % for canola oil as a function of time and method of pretreatment.

A canola oil sample was provided having a starting peroxide value of 9. Typical equilibrium metathesis conversion of canola oil is about 65-67%. In one experiment, without any chemical treatment, the canola oil was self-metathesized for 3 hours at 70° C. (3-NP). Additionally, in other experiments, several metal alkoxides were used to chemically pretreat the canola oil (for 2 hours at 100° C.) to observe whether or not the chemical treatment improved the subsequent self-metathesis reaction at 70° C. for 3 hrs. The metal alkoxide tests included: (a) 1 wt. % aluminum ethoxide (3A), (b) 0.1 wt. % aluminum isopropoxide (3B), (c) 0.1 wt. % titanium isopropoxide (3C), and (d) 0.1 wt. % zirconium ethoxide (3D). The conversion results are shown in FIG. 3.

Without chemical pretreatment, a conversion of <5% metathesized canola oil was achieved. Treatment of the canola oil with various metal alkoxides resulted in conversions between 55-60% after 3 hours. These results indicate that significant improvements can be made in the conversion of high peroxide value canola oil by the addition of a metal alkoxide pretreatment.

Peroxide values were also measured after each pretreatment, prior to the self-metathesis reaction. The chart below shows the results.

| Chemical Treatment | Peroxide Value (meq/kg) |
| --- | --- |
| None | 9 |
| 1 wt. % aluminum ethoxide | 0.53 |
| 0.1 wt. % aluminum isopropoxide | 2.6 |
| 0.1 wt. % titanium isopropoxide | 0.28 |
| 0.1 wt. % zirconium ethoxide | 0.73 |

Example 4

Figure 4:
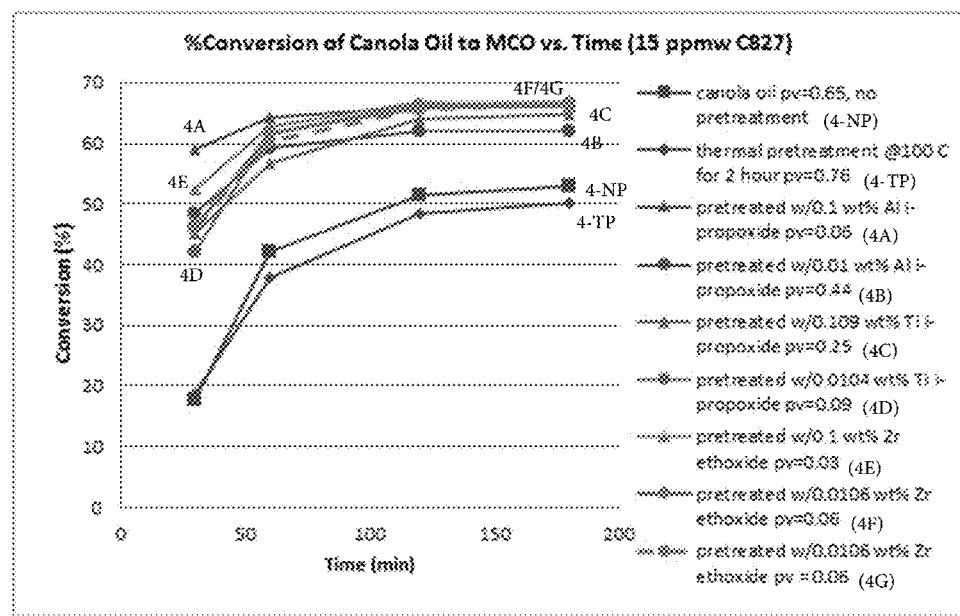
FIG. 4 is chart showing conversion % for "fresh" canola oil as a function of time and method of pretreatment.

A "fresh" canola oil sample was provided having a starting peroxide value of 0.65. In one experiment, without any chemical treatment, the canola oil was self-metathesized for 3 hours at 70° C. (4-NP). Also, in another experiment, a thermal pretreatment (without chemical treatment) of the soybean oil sample was conducted for 2 hours at 100° C. (4-TP). Additionally, in other experiments, several metal alkoxides were used to chemically pretreat the canola oil (for 2 hours at 100° C.) to observe whether or not the chemical treatment improved the subsequent self-metathesis reaction at 70° C. for 3 hrs. The metal alkoxide tests included: (a) 0.1 wt. % aluminum isopropoxide (4A), (b) 0.01 wt. % aluminum isopropoxide (4B), (c) 0.109 wt. % titanium isopropoxide (4C), (d) 0.0104 wt. % titanium isopropoxide (4D), (e) 0.1 wt. % zirconium ethoxide (4E), (f) 0.0106 wt. % zirconium ethoxide (4F), and (g) 0.0106 wt. % zirconium ethoxide (4G). The conversion results are shown in FIG. 4.

Peroxide values were also measured after each pretreatment, prior to the self-metathesis reaction. The chart below shows the results.

| Chemical Treatment | Peroxide Value (meq/kg) |
|---|---|
| None | 0.65 |
| None (thermal treatment at 100° C.) | 0.76 |
| 0.1 wt. % aluminum isopropoxide | 0.06 |
| 0.01 wt. % aluminum isopropoxide | 0.44 |
| 0.109 wt. % titanium isopropoxide | 0.25 |
| 0.0104 wt. % titanium isopropoxide | 0.09 |
| 0.1 wt. % titanium isopropoxide | 0.03 |
| 0.0106 wt. % zirconium ethoxide | 0.06 |
| 0.0106 wt. % zirconium ethoxide | 0.06 |

Example 5

A crude (cold-pressed) pennycress oil sample was provided. Part of the sample was further processed to produce bleached (B) and refined/bleached (RB) samples. In certain experiments, without any chemical treatment, the various pennycress oil samples were self-metathesized for 3 hours at 70° C. using different catalyst loadings of C827 to achieve equilibrium conversion. Without any pretreatment, 1000 ppmw C827 catalyst was needed to achieve equilibrium conversion for the crude pennycress oil sample. The B and RB pennycress samples achieved equilibrium conversion with 300 ppmw C827, demonstrating the utility of natural oil processing.

In another experiment, a crude pennycress oil sample underwent a thermal pretreatment at 200° C. for 2 hours. Equilibrium conversion of the thermally pretreated sample was achieved at 300 ppmw C827. In additional experiments, the pennycress oil samples were chemically treated with 1 wt. % zirconium ethoxide. The crude oil sample reached equilibrium conversion with a 200 ppmw catalyst loading. The B and RB samples each reached equilibrium conversion with 100 ppmw C827.

Example 6

Figure 5:
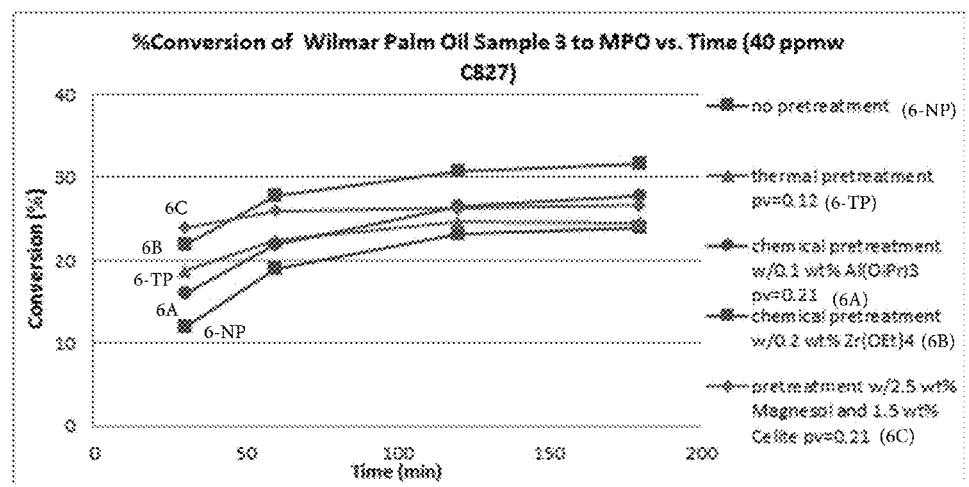
FIG. 5 is chart showing conversion % for palm oil as a function of time and method of pretreatment.

A refined palm oil sample was provided. In one experiment, without any chemical treatment, the palm oil sample was self-metathesized for 3 hours at 70° C. with a catalyst loading of 40 ppmw C827 (6-NP). In another experiment, a palm oil sample underwent a thermal pretreatment at 200° C. for 2 hours prior to the self-metathesis reaction with 40 ppmw C827 (6-TP). Additionally, in other experiments, metal alkoxides were used to chemically pretreat the palm oil (for 2 hours at 100° C.) to observe whether or not the chemical treatment improved the subsequent self-metathesis reaction at 70° C. for 3 hours at catalyst loading of 40 ppmw C827. The metal alkoxide tests included: (a) 0.1 wt. % aluminum isopropoxide (6A) and (b) 0.2 wt. % zirconium ethoxide (6B). Finally, in one experiment, the palm oil was pretreated with 2.5 wt. % Magnesol and 1.5 wt. % Celite (6C). The conversion results are shown in FIG. 5.

Example 7

An algal oil sample was provided. The composition of the crude sample was analyzed (shown in table below):

| Algal oil | wt. %, ppm |
|---|---|
| Free fatty acids | 5.04 wt. % |
| Phosphorous | 210 ppm |
| Calcium | 8.21 ppm |
| Magnesium | 89.1 ppm |
| Iron | 1.28 ppm |
| Copper | 20.0 ppm |
| Sulfur | 240 ppm |
| Sodium | 237 ppm |
| Karl Fisher Moisture | 300 ppm |

In three experiments, without any chemical treatment, the crude algal oil was self-metathesized at catalyst loadings of 1000 ppmw, 2000 ppmw, and 3000 ppmw C827. Also, in two different experiments, the algal oil underwent a thermal pretreatment (without chemical treatment) for 2 hours at 200° C. prior to being self-metathesized with 500 ppmw and 1000 ppmw C827. The product distribution results are shown in the table below.

| | | No Pretreatment | | | Thermal Pretreatment | |
|---|---|---|---|---|---|---|
| | Crude algal GC Area % | 1000 ppmw GC Area % | 2000 ppmw GC Area % | 3000 ppmw GC Area % | 500 ppmw GC Area % | 1000 ppmw GC Area % |
| C12:0 | 0.25 | 0.32 | 0.38 | 0.31 | 0.33 | 0.35 |
| C14:0 | 3.37 | 3.97 | 3.84 | 3.97 | 4.14 | 4.14 |
| C15:0 | 0.32 | 0.64 | 0.67 | 0.52 | 0.61 | 0.7 |
| C16:0 | 36.37 | 42.22 | 41.41 | 43.06 | 42.34 | 42.87 |
| C16:1 | 29.74 | 14.66 | 9.19 | 10.23 | 16.13 | 10.1 |
| C16:2 | 0.56 | 0.17 | 0.12 | 0.09 | 0.12 | 0.09 |
| C17:0 | 0.33 | 0.43 | 0.4 | 0.41 | 0.4 | 0.4 |
| C18:0 | 1.29 | 1.63 | 1.71 | 1.77 | 1.63 | 1.52 |
| C18:1 | 10.46 | 5.4 | 3.35 | 3.93 | 5.58 | 3.58 |
| C18:1 isomer | 0.45 | — | 0.11 | — | 0.09 | 0.09 |
| C18:2 | 1.45 | 0.53 | 0.46 | 0.35 | 0.57 | 0.5 |
| C18:3 | 0.184 | 0.22 | 0.16 | 0 | 0.17 | 0.16 |
| C20:0 | 0.12 | 0.15 | 0.14 | 0.1 | 0.15 | 0.13 |
| C20:1 | — | 0.19 | 0.13 | 0.14 | 0.17 | 0.18 |
| C20:3 | 0.5 | 0 | 0 | 0 | 0 | 0 |
| C20:4 | 2.82 | 0 | 0 | 0 | 0 | 0 |
| C20:5 | 8.09 | 0 | 0 | 0 | 0 | 0 |
| Me 9-ODDA | — | 4.85 | 6.58 | 8.09 | 4.43 | 6.4 |

"ppmw" indicates the catalyst loading

Additionally, in other experiments, several metal alkoxides were used to chemically pretreat the algal oil to observe whether or not the chemical treatment improved the subsequent self-metathesis reaction. The metal alkoxide tests included: (a) 1 wt. % aluminum isopropoxide and 500 ppmw C827 catalyst, (b) 1 wt. % zirconium ethoxide and 500 ppmw C827 catalyst, (c) 1 wt. % zirconium ethoxide and 250 ppmw C827 catalyst, and (d) 1 wt. % zirconium ethoxide and 300 ppmw C827 catalyst. The product distribution results are shown in the table below.

|  | Crude algal | 1 wt. % Al(O$i$Pr)$_3$ | 1 wt. % Zr(OEt)$_4$ | | |
| --- | --- | --- | --- | --- | --- |
|  | GC Area % | 500 ppmw GC Area % | 500 ppmw GC Area % | 250 ppmw GC Area % | 300 ppmw GC Area % |
| C12:0 | 0.25 | 0.34 | 0.43 | 0.34 | 0.35 |
| C14:0 | 3.37 | 3.94 | 4.07 | 4.22 | 4.13 |
| C15:0 | 0.32 | 0.58 | 0.71 | 0.75 | 0.8 |
| C16:0 | 36.37 | 40.49 | 40.95 | 43.43 | 40.82 |
| C16:1 | 29.74 | 16.87 | 9.34 | 11.58 | 10.42 |
| C16:2 | 0.56 | 0.13 | 0.09 | 0.22 | — |
| C17:0 | 0.33 | 0.37 | 0.38 | 0.4 | 0.38 |
| C18:0 | 1.29 | 1.53 | 1.44 | 1.7 | 1.67 |
| C18:1 | 10.46 | 5.9 | 3.24 | 4.12 | 3.61 |
| C18:1 isomer | 0.45 | 0.08 | 0.12 | 0 | 0.15 |
| C18:2 | 1.45 | 0.56 | 0.48 | 0.53 | 0.52 |
| C18:3 | 0.184 | 0.17 | 0.15 | 0 | 0.18 |
| C20:0 | 0.12 | 0.16 | 0.24 | 0 | 0.2 |
| C20:1 | — | 0.15 | 0.13 | 0 | 0.19 |
| C20:3 | 0.5 | 0 | 0 | 0 | 0 |
| C20:4 | 2.82 | 0.09 | 0 | 0 | 0 |
| C20:5 | 8.09 | 0 | 0 | 0 | 0 |
| Me 9-ODDA | — | 3.26 | 5.49 | 5.61 | 7.16 |

"ppmw" indicates the catalyst loading

What is claimed is:

1. A method of metathesizing a feedstock comprising:
   providing a feedstock comprising a natural oil and peroxide poisons;
   chemically treating the feedstock with a metal alkoxide to reduce the amount of peroxide poisons in the feedstock through a chemical reaction of the peroxide poisons with the metal alkoxide; and
   following the chemically treating, combining a metathesis catalyst with the chemically treated feedstock to metathesize the chemically treated feedstock, wherein the metal alkoxide comprises a metal selected from the group consisting of aluminum, titanium, zirconium, copper, iron, cerium, and silicon.

2. The method of claim 1, wherein the metal alkoxide comprises an alkoxide selected from the group consisting of methoxide, ethoxide, n-propoxide, isopropoxide, butoxide, 2-methylpropoxide, and tert-butoxide.

3. The method of claim 1, wherein the metal alkoxide is selected from the group consisting of titanium isopropoxide, aluminum ethoxide, aluminum isopropoxide, zirconium ethoxide, and mixtures thereof.

4. The method of claim 1, wherein the metal alkoxide is added at a level of between 0.01 wt % and 1 wt % of the feedstock.

5. The method of claim 1, wherein the chemically treating is conducted at a temperature between 25° C. and 125° C.

6. The method of claim 1 further comprising combining an adsorbent material with the feedstock.

7. The method of claim 6, comprising combining the adsorbent material with the feedstock in an amount between 0.1 and 3.0 wt % based on the weight of the feedstock.

8. The method of claim 6, comprising combining the adsorbent material with the feedstock in an amount between 0.2 and 2.0 wt % based on the weight of the feedstock.

9. A method of metathesizing a feedstock comprising:
   providing a feedstock comprising a natural oil and peroxide poisons, the feedstock having a starting peroxide value;
   chemically treating the feedstock with a metal alkoxide for a time sufficient to reduce the starting peroxide value of the feedstock by approximately 80% or more through a chemical reaction of the peroxide poisons with the metal alkoxide; and
   following the chemically treating, combining a metathesis catalyst with the chemically treated feedstock to metathesize the chemically treated feedstock, wherein the metal alkoxide comprises a metal selected from the group consisting of aluminum, titanium, zirconium, copper, iron, cerium, and silicon.

10. The method of claim 9, wherein the chemically treating decreases the starting peroxide value of the feedstock by approximately 90% or more.

11. The method of claim 9, wherein the time is between 1 hour and 24 hours.

* * * * *